US011301538B1

United States Patent
Zanni et al.

(10) Patent No.: US 11,301,538 B1
(45) Date of Patent: Apr. 12, 2022

(54) DATA MANAGEMENT IN MULTI-APPLICATION WEB PAGES

(71) Applicants: Atlassian Pty Ltd., Sydney (AU); Atlassian Inc., San Francisco, CA (US)

(72) Inventors: Daniele Zanni, Sydney (AU); Peggy Pei-Wen Kuo, Sydney (AU); Alberto Gasparin, Sydney (AU); Ian Michael Hill, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/179,343

(22) Filed: Feb. 18, 2021

(51) Int. Cl.
*G06F 16/958* (2019.01)
*G06F 9/451* (2018.01)
*G06F 8/71* (2018.01)
*G06F 3/14* (2006.01)
*H04L 67/00* (2022.01)
*H04L 67/02* (2022.01)

(52) U.S. Cl.
CPC ............ *G06F 16/958* (2019.01); *G06F 3/14* (2013.01); *G06F 8/71* (2013.01); *G06F 9/451* (2018.02); *H04L 67/34* (2013.01); *H04L 67/02* (2013.01)

(58) Field of Classification Search
CPC . G06F 16/958; G06F 3/14; G06F 8/71; G06F 9/451; H04L 67/02; H04L 67/34
See application file for complete search history.

(56) References Cited

U.S. PATENT DOCUMENTS

| | | | | |
|---|---|---|---|---|
| 10,346,184 B2* | 7/2019 | Jann | ........................... | G06F 8/38 |
| 10,353,534 B2* | 7/2019 | Grammatikakis | .. | G06F 16/9577 |
| 10,761,817 B2* | 9/2020 | Rahmathali | ............. | G06F 9/451 |
| 10,761,907 B2* | 9/2020 | Attard | ........................ | G06F 8/61 |
| 10,908,779 B2* | 2/2021 | Li | ........................... | H04L 51/04 |
| 11,138,022 B2* | 10/2021 | Rohde | ................ | G06F 16/2455 |
| 2007/0130572 A1* | 6/2007 | Gilbert | .................... | H04L 67/28 |
| | | | | 719/318 |
| 2014/0181703 A1* | 6/2014 | Sullivan | ................... | G06F 9/451 |
| | | | | 715/762 |
| 2015/0278371 A1* | 10/2015 | Anand | ................... | G06F 16/338 |
| | | | | 707/723 |
| 2018/0225099 A1* | 8/2018 | Rempell | ............... | G06F 3/0482 |

* cited by examiner

*Primary Examiner* — Marina Lee
(74) *Attorney, Agent, or Firm* — Brownstein Hyatt Farber Schreck, LLP

(57) ABSTRACT

Described herein is a computer implemented method for generating a webpage. The method comprises creating, by a first application, a first application-specific state store, storing an initial value of a first application-specific field therein, and displaying the initial value in a first user interface element. In addition, the first application creates a field values store to be used by the first application and a second application of the webpage. The first application stores an initial value of a first common field in the field values store. The initial value of the first common field is then displayed by the first application in a second user interface element and by the second application in a third user interface element.

20 Claims, 12 Drawing Sheets und DATA MANAGEMENT IN
MULTI-APPLICATION WEB PAGES

TECHNICAL FIELD

The present disclosure is directed to data management in multi-application web pages.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Many software products and services rely on web pages to provide end users with information and functionality. Generally speaking, in order to display a web page, a user device retrieves data from a server and processes that data to render the web page on the user device.

The retrieval of data from a server consumes various resources, for example computational resources at the user device to make the request and process the results, data storage resources at the user device to store the data received from the server (often transitorily), network bandwidth for communications between the user device and server, and computational resources at the server in receiving, processing, and responding to the request.

Figure 1:
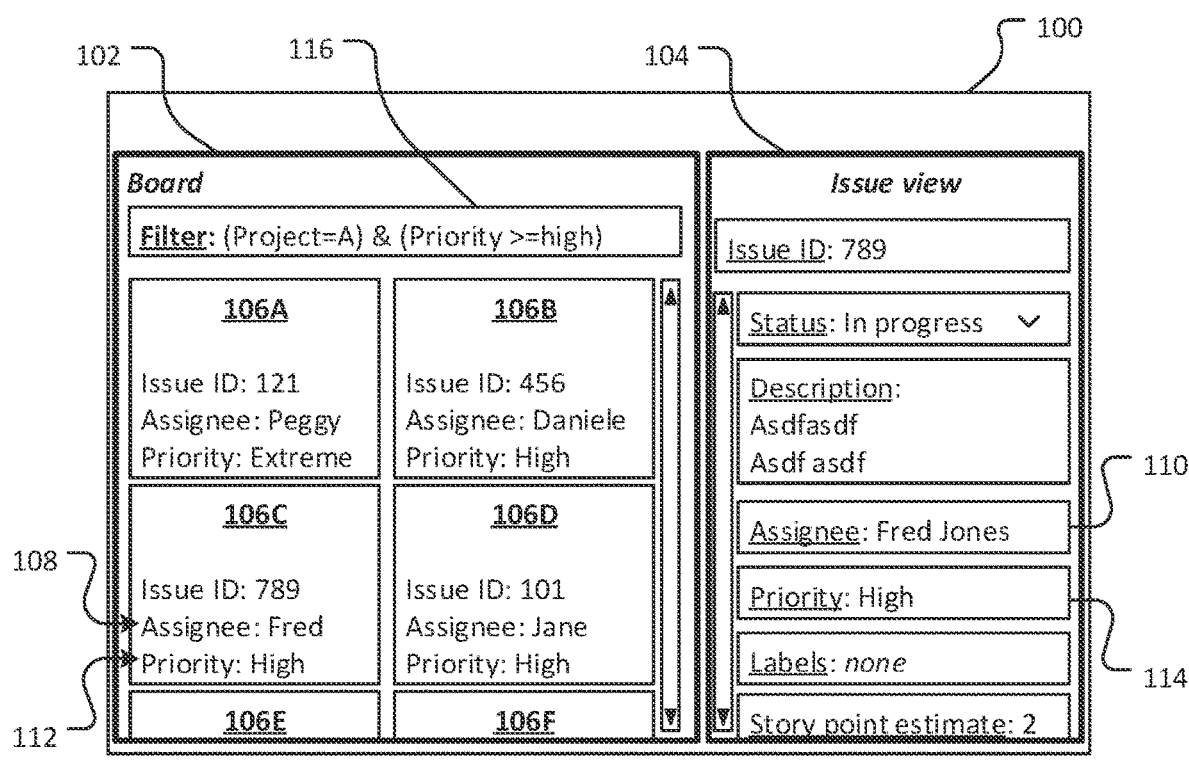
FIG. 1 depicts the display generated by a multi-application webpage.

While the disclosed embodiments are amenable to various modifications and alternative forms, specific embodiments are shown by way of example in the drawings and are described in detail. It should be understood, however, that the drawings and detailed description are not intended to limit the embodiments to the particular form disclosed. The intention is to cover all modifications, equivalents, and alternatives falling within the spirit and scope of the present disclosure as defined by the appended claims.

DETAILED DESCRIPTION

In the following description, for the purposes of explanation, numerous specific details are set forth in order to provide a thorough understanding of the present disclosure. It will be apparent, however, that features of the present disclosure may be practiced without these specific details. In some instances, well-known structures and devices are shown in block diagram form in order to avoid unnecessary obscuring.

The present disclosure relates to managing data in multi-application web pages.

In the present context, a multi-application web page is a web-page that is composed of multiple separate applications. FIG. 1 provides a depiction of the display of a multi-application webpage 100. In this example, webpage 100 is composed of two user interface (UI) areas 102 and 104, each of which is generated by a separate application.

For descriptive purposes the present disclosure will be described in the context of an issue tracking system which is used to create, manage and track issues such as service desk tickets, software bugs, to-do items, software features being developed, and/or work items of any description. The techniques and features described herein may, however, be applied to any multi-application webpage in which multiple applications may need to display the same field.

In the particular example of FIG. 1, UI area 102 is an issue board UI presented/controlled by a boards application. The board UI area 102 displays a plurality of issue cards 106 (106A to 106F), each of which provides summary information in respect of a particular issue. The specific issues displayed by the boards application at a given time are determined by a filter or search string—for example a user may configure a board to display cards 106 for all issues relating to a particular project; for all issues assigned to a particular person/set of people/team; for all issues of a certain priority level; or issues defined by any other criteria.

In FIG. 1, UI area 104 is an issue view UI presented/controlled by an issue view application. The issue view UI area 104 provides detailed information in respect of a particular issue selected by a user (for example an issue selected by a user interacting with a particular issue card 106 on the boards UI area 102). In this example, the issue view UI is displaying details in respect of issue identifier (ID) 789, which corresponds to card 106C displayed in the boards UI area 102.

As can be seen, each card 106 in the boards UI area 102 and the issue view UI area 104 both display an issue assignee field (via UI elements 108 and 110 respectively) and an issue priority field (via UI elements 112 and 114 respectively). Although, for example, UI elements 108 and 110 present these fields slightly differently, the actual field they relate to is the same—i.e. there is a remote data source which holds the actual (source of truth) values of the assignee and priority fields in respect of issue ID 789 and which has been queried to provide these values to UI elements 108 and 110.

For an issue tracking system such as this, a specific field may be identified by a combination a field key (or field name which uniquely identifies the field in question) and an issue key (which uniquely identifies a particular issue). For example, in FIG. 1, the value associated with (Priority, 789) (i.e. the Priority field of issue ID 789) is "high", while the value associated with (Priority, 121) is "Extreme". In alternative contexts/embodiments specific fields may be identified using different identifiers.

A common way of building applications to generate UIs such as 102 or 104 is to use functions provided by a UI software library such as the JavaScript (JS) React library. An application state storage library (e.g. the Redux JS library) is also often used to create and manage a state store—i.e. a store for state data used by the application. For applications structured in this way, conventional logic is that an application's state store should maintain all data required by the application. As described below, however, this can cause issues where multiple applications make use of the same field(s).

Figure 2:
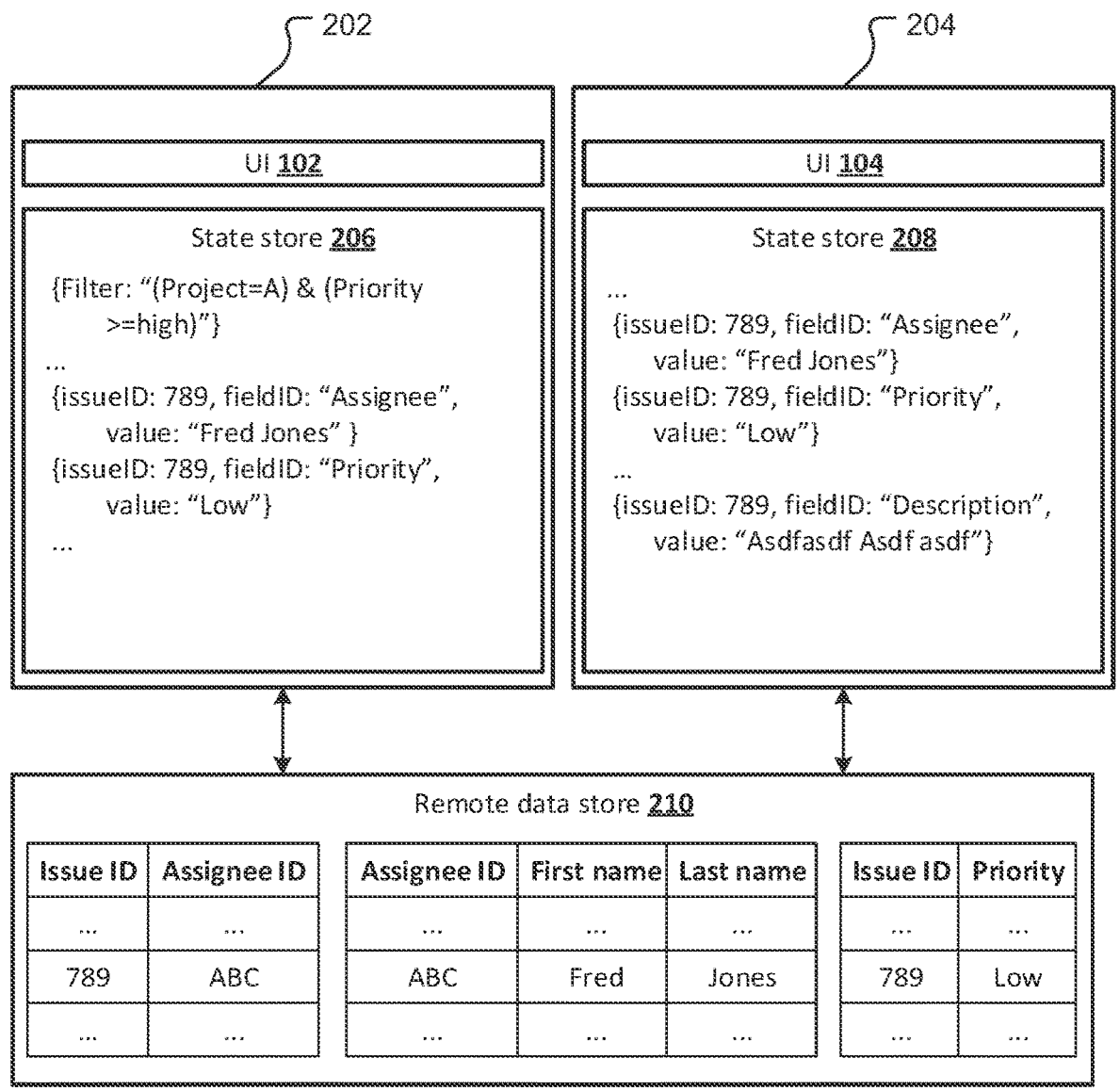
FIG. 2 depict components involved in generating a multi-application webpage.

FIG. 2 provides a depiction of two applications 202 and 204 which, respectively, generate UIs 102 and 104. Applications 202 and 204 are (in this example) run by a web browser application on a user device (for example device 310 described below). FIG. 2 also depicts a remote data store 210 that is maintained by a server system (e.g. system 330 described below).

In this example, remote data store 210 maintains the actual data which includes (in this example) issue assignee and priority data. In generating UI area 102, application 202 (inter alia) requests issue assignee and priority from the remote data store 210 and stores this data in its local state store 206. Similarly, in generating UI area 104, application 204 (inter alia) requests the same issue assignee and priority from the remote data store 210 and stores this data in its local state store 208.

At this point, therefore, both applications 202 and 204 have consumed computational, network, and storage resources in storing the same data (and the remote server system has responded to two requests in respect of the same data).

Further issues arise where a user edits a field that is used by multiple applications. For example, application 204 may generate UI area 104 such that a user can edit the issue assignee. In the present context, such a change may trigger the following sequence of events:
 a) Application 204 receives the new assignee value and stores this in its local state store 208 (in this example application 204 stores the new value optimistically, i.e. on the presumption that data will be successfully updated at the remote data store 210).
 b) The new assignee value is updated in UI area 104 (at which point UI area 104 displays the edited assignee while UI area 102 displays the pre-edited assignee value, potentially causing user confusion).
 c) Application 204 attempts to store the new assignee value at the remote data store 210 (e.g. via a relevant API call).
 d) Presuming the remote data store update is successful, application 204 receives confirmation that the new assignee value has been stored.
 e) Application 204 broadcasts a notification that the value of the assignee field for a particular issue ID (e.g. issue ID 789) has changed.
 e) Application 202, which is configured to listen for such broadcast notifications, receives the notification re the change in assignee field for issue ID 789.
 f) Application 202 requests the current assignee value for issue ID 789 from the remote data store 210.
 g) Application 202 receives the current assignee value for issue ID 789 from the remote data store 210.
 h) Application 202 updates its local state store 206 with the assignee value received from the remote data store 210, which causes the new value to be displayed in UI area 102.

Several aspects of this sequence of events are (or may be) undesirable. For example, multiple application's querying the remote data store for the same field (and the associated processing/bandwidth) will typically be undesirable, as will a delay between the user updating a field via one application and the updated value for that field being displayed by the other application.

The present disclosure provides mechanisms to facilitate use of what will be referred to as common fields—fields that are (or may be) used by multiple applications of a webpage. As discussed below, where a webpage application defines a common field data in respect of the field (e.g. the field value and, in some cases, additional data relevant to the field) is stored in one or more common state stores which can be accessed by all applications of the webpage that need to do so.

In contrast, fields that are not defined to be common fields will be referred to as application-specific fields. These will typically be fields which are not (or, at least, are not envisaged to be) required by other applications.

For example, in webpage 100, the 'Filter' field 116 (displaying the filter used to generate the board) may not be defined as a common field on the basis that it does not need to be used by any other application. The issue assignee, however, is likely to be used by other applications and as such may be defined as a common field.

Where a field is defined as a common field data in respect of that field can be accessed from the common state store(s) by multiple applications but need not be. For example, if the issue assignee is defined as a common field associated data will be stored in one or more common state stores regardless of whether other applications of the webpage need that field or not.

Figure 3:
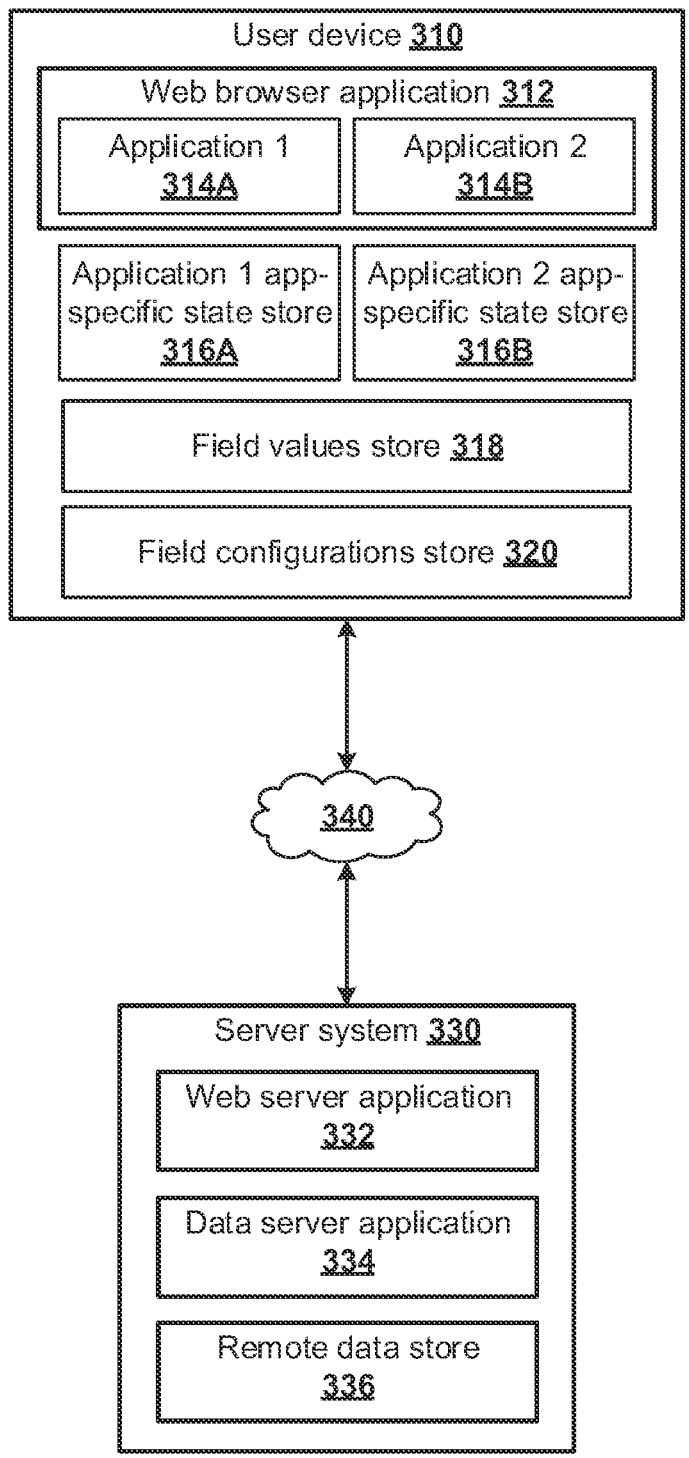
FIG. 3 is a block diagram of a networked environment according to aspects of the present disclosure.

Turning to FIG. 3, an example environment 300 in which embodiments and features of the present disclosure are implemented. Example environment 300 includes a user device 310 and server system 330 interconnected via one or more networks 340.

The feature of the present disclosure will be described in the context of a web browser application 312 which operates to display webpages. The features and techniques described herein could, however, be performed by alternative types applications that display user interfaces other than web pages.

User device 310 includes a web browser application 312 (browser 312 for short). In the course of its operation, browser 312 displays webpages (such as webpage 100 described above). This includes retrieving data from and communicating data to server system 330 (via network 340), using for example the hypertext transfer protocol (HTTP).

In the present disclosure, a webpage being displayed by browser 312 is composed of multiple applications 314—in this specific example two applications 314A and 314B. Each application 314 includes data (e.g. JavaScript code) that is stored in local memory (e.g. memory 408 described below) and executed by the browser 312 to provide a webpage (such as webpage 100) on the user device 310.

As described in further detail below each application 314 creates an application-specific state store 316 (i.e. a state store) for storing application-specific state data. In this example, applications 314A and 314B respectively create application-specific stores 316A and 316B.

In addition, at least one application 314 creates at least one common state store for storing data in respect of common fields. The common state store(s) can be used/accessed by all applications of the webpage 100.

In the described embodiments, two common state stores are created. A field values store 318 is created to store the actual values of all common fields that are defined by all applications 314 of a given webpage. In addition, a separate field configurations store 320 is created to store configuration data (described further below) associated with all common fields defined by webpage applications 314. I.e. if application 314A defines a first common field and application 314B defines a second common field, field values for both of those common fields are stored in the field value store 318 and field configuration data for both of those common fields is (if required) stored in field configurations store 320.

Creating separate field values and field configurations stores can provide advantages, particularly where one or more applications may only need to display the current value of a field (without allowing that value to be edited) while other applications may need to display the current value and allow a user to edit/change the value of the field. For example, the boards application contributing to webpage 100 may only need to display the current value of the "priority" field 112 shown in cards 106. In this case the boards application will create a UI element to display the field value and can retrieve the value of the priority field from the field values store 318. In contrast, the issue view application may need the "priority" field 114 to be editable. In this case the issue view application also retrieves the value of the priority field from the field values store 318, but can additionally retrieve configuration information in respect of the priority field from the field configurations store 320 (e.g. configuration information such as allowable values for the field, whether the field is required, and/or other configuration information). The issue view application can then use the configuration information to create appropriate UI elements and interactions for editing the field.

In alternative embodiments, however, a single common state store may be created and used to store both field values and configuration data for all common fields defined by webpage applications 314.

Stores 316A, 316B, 318, and 320 are created and maintained in volatile memory of the user device 310 (e.g. memory 408 described below).

User device 310 may be any form of computing device. Typically, user device 310 will be personal computing devices—e.g. a desktop computer, laptop computer, tablet computer, smart phone, or other computing device.

Server system 330 includes a web server application 332, a data server application 334, and a remote data store 336.

Web server application 332 configures the server system 330 to provide server side functionality for clients—for example web applications (such as 312) running on user devices (such as 310). Generally speaking, this involves receiving and responding to requests from client web browsers 312. While server system 330 has been illustrated with a single web server application 332, it may provide multiple server applications.

Server system 330 also includes a data server application 334 which is used (e.g. by web server application 332) to retrieve data from and write data to the remote data store 336 (i.e. physical memory on which data is stored). Data server application 334 may be any appropriate data server, for example a SQL server or the like. While a single remote data store 336 is shown server system 330 may provide multiple data stores. For example, server system 330 may maintain one data store for storing field values and another data store for storing field configuration data.

Web server application 332 and data server application 334 may run on the same physical computer system or separate physical computer systems that are in communication (e.g. via a direct or networked connection). Similarly, data server application 334 may connect to remote data store 336 directly or via a network (e.g. a local area or other network).

In certain embodiments, the server system 330 is a scalable system. Depending on demand from clients (and/or other performance requirements), compute nodes can be provisioned/de-provisioned on demand. As an example, if there is high client demand additional server applications 332 may be provisioned to cater for that demand. In this case, each functional component of the server system 330 may involve one or several applications running on the same or separate computer systems, each application including one or more application programs, libraries, APIs or other software that implements the functionality described herein.

Communications between the various systems in environment 300 are via one or more networks 340. Network 340 may be a local area network, public network (e.g. the Internet), or a combination of interconnected networks.

While environment 100 has been provided as an example, alternative system environments/architectures are possible.

The features and techniques described herein are implemented using one or more computer processing systems. For example, in networked environment 300 described above, user device 310 is a computer processing system (for example, a personal computer, tablet/phone device, or other computer processing system). Similarly, the various functions performed by the server system 330 are performed by one or more computer processing systems (e.g. server computers or other computer processing systems).

Figure 4:
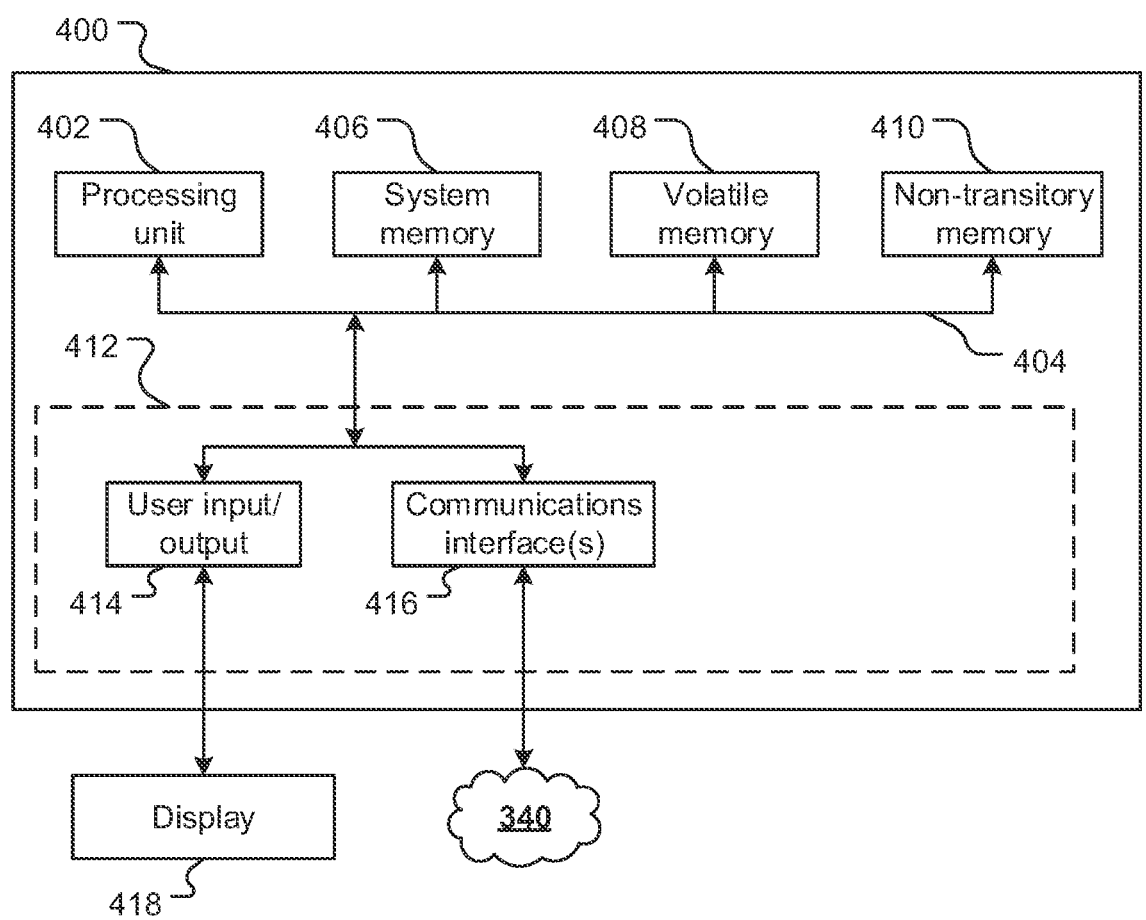
FIG. 4 is a block diagram of a computing system with which various embodiments of the present disclosure may be implemented.

FIG. 4 provides a block diagram of a computer processing system 400 configurable to perform various functions described herein. System 400 is a general purpose computer processing system. It will be appreciated that FIG. 4 does not illustrate all functional or physical components of a computer processing system. For example, no power supply or power supply interface has been depicted, however system 400 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 400 includes at least one processing unit 402. The processing unit 402 may be a single computer processing device (e.g. a central processing unit, graphics processing unit, or other computational device), or may include a plurality of computer processing devices. In some instances, where a computer processing system 400 is described as performing an operation or function all processing required to perform that operation or function will be performed by processing unit 402. In other instances, processing required to perform that operation or function may also be performed by remote processing devices accessible to and useable by (either in a shared or dedicated manner) system 400.

Through a communications bus 404, the processing unit 402 is in data communication with a one or more machine readable storage (memory) devices which store instructions and/or data for controlling operation of the processing system 400. In this example system 400 includes a system memory 406 (e.g. a BIOS), volatile memory 408 (e.g. random access memory such as one or more RAM modules), and non-volatile memory 410 (e.g. one or more hard disk or solid state drives).

System 400 also includes one or more interfaces, indicated generally by 412, via which system 400 interfaces with various devices and/or networks. Generally speaking, other devices may be integral with system 400, or may be separate. Where a device is separate from system 400, connection between the device and system 400 may be via wired or wireless hardware and communication protocols, and may be a direct or an indirect (e.g. networked) connection.

Wired connection with other devices/networks may be by any appropriate standard or proprietary hardware and connectivity protocols. For example, system 400 may be configured for wired connection with other devices/communications networks by one or more of: Universal Serial Bus (USB); eSATA; Thunderbolt; Ethernet; HDMI. Other wired connections are possible.

Wireless connection with other devices/networks may similarly be by any appropriate standard or proprietary hardware and communications protocols. For example, system 400 may be configured for wireless connection with other devices/communications networks using one or more of: BlueTooth; WiFi; near field communications (NFC); Global System for Mobile Communications (GSM); Enhanced Data GSM Environment (EDGE); long term evolution (LTE); wideband code division multiple access (W-CDMA); code division multiple access (CDMA). Other wireless connections are possible.

Generally speaking, and depending on the particular system in question, devices to which system 400 connects—whether by wired or wireless means—include one or more input devices to allow data to be input into/received by system 400 for processing by the processing unit 402, and one or more output device to allow data to be output by system 400. Example devices are described below, however, it will be appreciated that not all computer processing systems will include all mentioned devices, and that additional and alternative devices to those mentioned may well be used.

For example, system 400 may include or connect to one or more input devices by which information/data is input into (received by) system 400. Such input devices may include keyboards, mice, trackpads, microphones, accelerometers, proximity sensors, GPS devices and the like. System 400 may also include or connect to one or more output devices controlled by system 400 to output information. Such output devices may include display devices, speakers, and/or other output devices. System 400 may include or connect to devices which act as both input and output devices, for example memory devices (hard drives, solid state drives, disk drives, compact flash cards, SD cards and the like) which system 400 can read data from and/or write data to, and touch screen displays which can both display (output) data and receive touch signals (input).

Where the system 400 is user device such as 310, the system 400 includes or connects to a display 418 to output information. The display 418 may be a LCD, touch screen display, or other display.

System 400 also includes one or more communications interfaces 416 for communication with a network, such as network 340 of environment 300. Via the communications interface(s) 416 system 400 can communicate data to and receive data from networked devices, which may themselves be other computer processing systems.

System 400 may be any suitable computer processing system, for example, a server computer system, a desktop computer, a laptop computer, a netbook computer, a tablet computing device, a mobile/smart phone, a personal digital assistant, or an alternative computer processing system.

System 400 stores or has access to computer applications (also referred to as software or programs)—i.e. computer readable instructions and data which, when executed by the processing unit 402, configure system 400 to receive, process, and output data. Such instructions and data can be stored on non-transitory machine readable medium accessible to system 400. For example, instructions and data may be stored on non-transitory memory 410. Instructions and data may be transmitted to/received by system 400 via a data signal in a transmission channel enabled (for example) by a wired or wireless network connection over a communications interface such as 412.

Applications accessible to system 400 will typically include an operating system application. In addition, and referring.

System 400 also stores or has access to applications which, when executed by the processing unit 402, configure system 400 to perform various computer-implemented processing operations described herein. For example, and referring to the networked environment of FIG. 3 above, user device 310 includes a web browser application 312 which configures the user device 310 to perform various operations described herein. Similarly, server system 330 includes a web server application 332 which configures the server system 330 to perform various operations described herein.

Over the course of its operations, browser application 312 generates webpages such as webpage 100. Generally speaking, this involves browser 312 receiving webpage data from a server system 330 (and in particular web server application 332). This will typically be in response to a request generated by browser application 312 and sent to an appropriate server system endpoint (e.g. a URL).

In the present context, the webpage data includes application code (e.g. JavaScript code) in respect of each application that the webpage in question is composed of. In the present examples, the webpage data includes application code in respect of two webpage applications 314A and 314B. The webpage data may, however, include application code in respect of any number of applications that the webpage is composed of. By way of example, the webpage data may be received as HTML which includes multiple <script> . . . </script> blocks, each <script> . . . </script> block defining an application of the webpage. As an alternative example, application code may be provided in application bundles (e.g. a boards.js bundle, an issue-view.js bundle) which are retrieved by browser 312 from the server system 330.

Once received, browser 312 processes the webpage data as normal. Generally speaking, and by way of example, processing the webpage data may include rendering HTML elements and executing application code to, for example: cause UI elements to be displayed (e.g. on a display 418 of a user device 310), receive and process to user input made via those UI elements (received, for example, via an input device such as a touchscreen display or other device), generate and communicate server requests to a web server application 332 (such requests being for the web server application 332 to perform processing, retrieve data from and/or write data to one or more remote data stores 336), and receive/process responses to server requests.

When developing an application 314 a developer may define/create both application-specific fields and common fields. Application-specific fields can be defined/created in any conventional way, however to illustrate the difference between application-specific fields and common fields certain high-level operations involved in creating and handling application-specific fields will be described with reference to FIGS. 5, 6, and 7. Following this, operations involved in creating and handling common fields will be described with reference to FIGS. 8, 9, 10, and 11. The processing described below is limited to certain processing involved in handling application-specific and common fields. The particular processing performed for a given application (e.g. 314A) will, however, depend on that application's code and include additional operations to those explicitly described.

Figure 5:
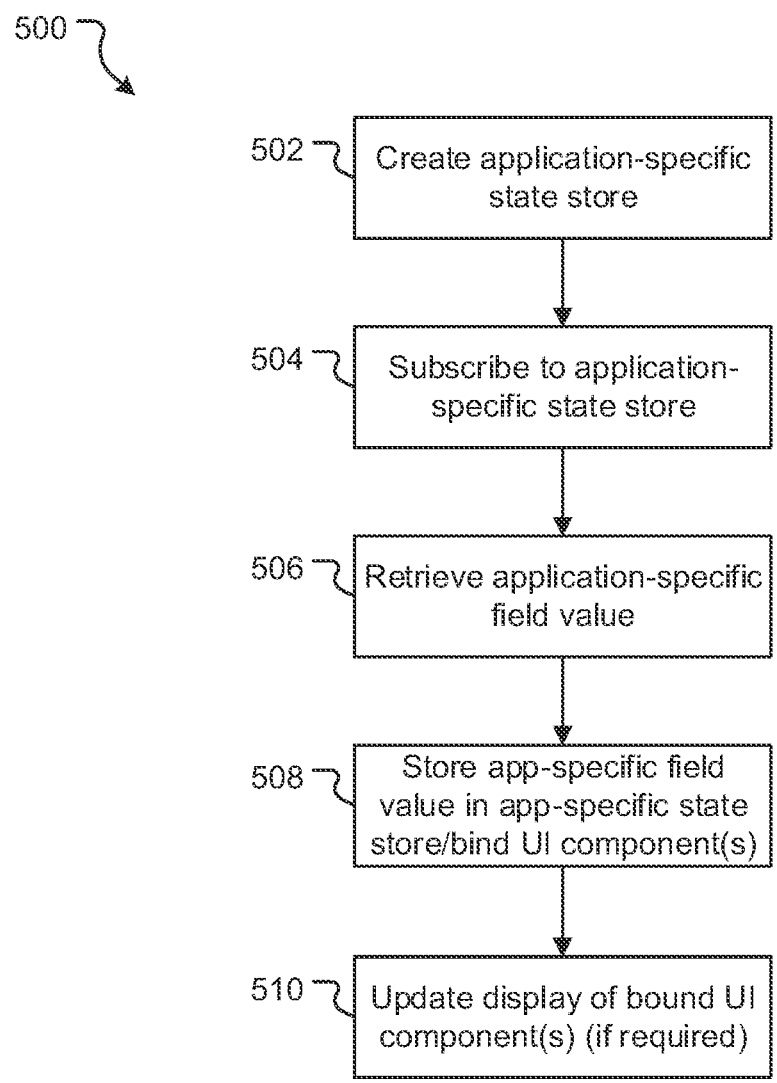
FIG. 5 is a flowchart depicting operations involved in initial processing of application-specific fields.

FIG. 5 provides a flowchart 500 indicating operations performed by an application 314 (in this example application 314A, as executed by browser 312) on executing code that defines an application-specific field.

At 502, application 314A creates an application-specific state store 316A. The application-specific state store 316A is created in local memory of the user device 310, for example in volatile memory 408. As one example, the application-specific state store 316A may be a Redux store created by calling a 'createStore( )' function (imported from the 'redux' library). Alternative state stores may be used for the application-specific state store 316A.

At 504, application 314A subscribes to the application-specific state store 316A created at 502. In the Redux example, this can be by calling a 'connect( )' function from 'react-redux' to subscribe to changes in Redux.

At 506, application 314A retrieves the value of the application-specific field in question. In some cases the field value may be included in the webpage data that has already been received. Alternatively, the application may cause the value to be retrieved from a remote data store 336 by generating and communicating one or more requests to web server application 332. On receiving such a request web server application 332 queries the remote data store 336 (via the data server application 334) to retrieve the requested field value and, once received, communicates the value back to browser application 312/application 314A.

At 508, application 314A stores the application-specific field value (and any other relevant data, for example a field identifier) in the application-specific state store 316A. In the Redux example, a value may be stored by execution of a 'combineReducers( )' function. In addition, application 314A will typically link/bind one or more components (e.g. React components) to the stored value that has been added to the application-specific state store 316A.

At 510, any components of application 314A that are bound or otherwise linked to the field that has been updated at 508 receive the value for that field. This can trigger various operations including, for example, updating UI elements managed by a component to display the value for the field stored in the application-specific state store 316A. It is again noted that only components controlled/maintained by application 314A are bound to application-specific state store 316A.

In some instances, the application code may operate such that all application-specific fields can be retrieved from the remote data store at once (e.g. at 506). In other cases, application-specific fields may be encountered at different points in the application code. In this case, once the application-specific state store has been created at 502, application 314A stores any further application-specific fields defined by the application 314A in that store (e.g. by repeating operations 506 and 508 but without having to re-create or re-subscribe to the application-specific state store 316A).

Figure 6:
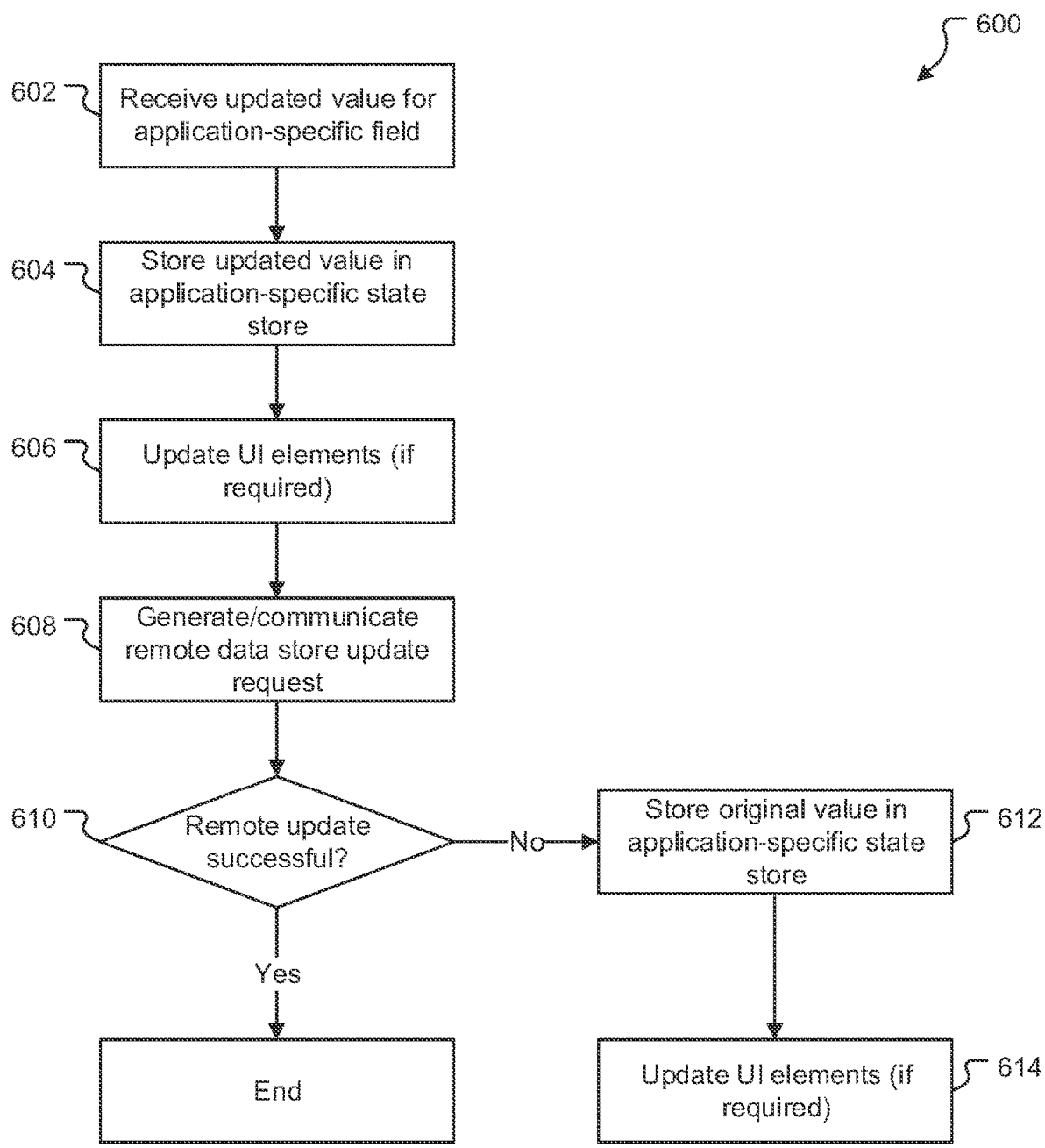
FIG. 6 is a flowchart depicting operations involved in processing a locally originating change of an application-specific field.

Turning to FIG. 6, a flowchart 600 depicting operations involved in processing a locally originating update to an application-specific field will be described.

As used herein, a locally originating update is an update made to a field via a UI element defined by a particular application 314A. Referring to FIG. 1, an example of a locally originating update would be a user interacting with the assignee UI element 110 to change the assignee value (e.g. from "Fred" to "Amy").

In the example described with reference to FIG. 6, the locally originating update is made via a UI element controlled controlled/maintained by application 314A.

At 602, application 314A receives an updated value for an application-specific field.

At 604, application 314A updates the value of the relevant application-specific field in the application-specific state store 316A with the new value (e.g. by execution of a 'dispatch( )' function where the application-specific state store is a Redux store).

Any components of application 314A that are bound or otherwise linked to the application-specific state store 316A receive the new field value (as stored at 604). Bound components can then perform various operations based on the new value including, for example, updating any relevant UI elements (at 606) to display the value for the field that is now stored in the application-specific state store 316A.

At 608, application 314A generates and communicates a remote data store update request (e.g. an API request). The request identifies the application-specific field in question and includes the updated value for that field. The request is communicated (in this example) to web server application 332, which receives the request and attempts to update the field in the remote data store 336 (via data server application 334).

At 610, application 314A determines if the remote data store update request was successful or not. For example, application 314A may receive an update response message from the web server application 332 indicating whether the updated value for the field was successfully stored in the remote data store 336 or not.

If the remote update was successful, processing the update is complete. If not, processing proceeds to 612.

At 612, application 314A reverts to the original (pre-update) value of the application-specific field. This involves writing the original value of the field back to the application-specific state store 316A.

At 614, any components that are bound or linked to the application-specific state store 316A receive the reverted value of the field as stored at 612. As with operation 606 this can trigger various operations by the bound components, including updating UI elements to display the value for the field now stored in the application-specific state store 316A.

The changed value stored at 612 is again received by all components of application 314A that are bound or linked to the application-specific state store 316A. Bound components can then perform various operations based on the new value including, for example, updating any relevant UI elements (at 614) to display the value for the field that is now stored in the application-specific state store 316A.

In alternative embodiments, rather than optimistically updating the application-specific data store 316A at 604, application 314A may operate so that the application-specific data store 316A is only updated with the new value of a field once confirmation of a successful update has been received from the sever application 332. This prevents the possibility of the field's value needing to be rolled-back (e.g. at 612 and 614), but introduces a delay between a user updating the data field and seeing that change reflected in the UI.

Figure 7:
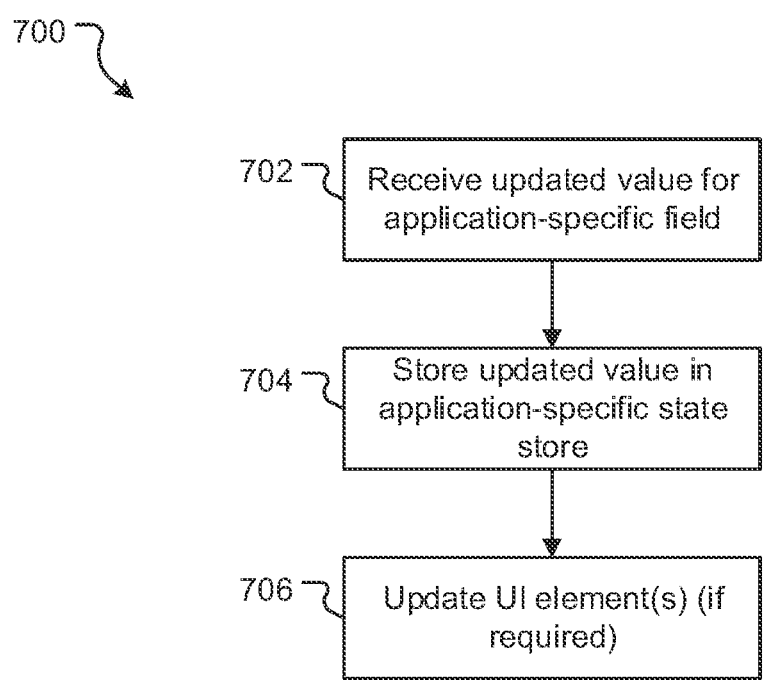
FIG. 7 is a flowchart depicting operations involved in processing a remotely originating change of an application-specific field.

Referring to FIG. 7, a flowchart 700 depicting operations involved in processing a remotely originating update to an application-specific field will be described.

As used herein, a remotely originating update is an update to a field defined by a particular application 314A that is received from a remote location, for example web server application 332. An example of a remotely originating update would be if the value of a field (e.g. the assignee field) was changed by a mechanism other than webpage 100 (e.g. another user of a separate webpage/interface to the remote data store, an automatic server update, or any other means) and notification of that change is communicated to the webpage (e.g. due to one or more applications including code that configures browser 312 to listen for/receive such notifications or otherwise request data updates).

In this example the operations are described as being performed by application 314A (as executed by browser 312).

At 702, application 314A receives an updated value for an application-specific field (the application-specific field being controlled/maintained by webpage application 314A).

The updated value is received from server system 330, typically as a result of the value of the field in question having changed—e.g. by a server process, another user (on another webpage/server client) changing the value, or any other remotely originating change to the field's value. The application 314A may request the new value may from the server system 330 (e.g. due to receiving a notification or otherwise detecting that the value of an application-specific field has/may have changed). Alternatively, the new value may be pushed from the server system 330 to the web browser 312/application 314A.

At 704, application 314A updates the relevant field in the application-specific state store 316A based on the updated value received from the server system 330.

Any components of application 314A that are bound or linked to the application-specific state store 316A receive the new field value (as stored at 704). Bound components can then perform various operations based on the new value including, for example, updating any relevant UI elements (at 706) to display the value for the field that is now stored in the application-specific state store 316A.

The update is then complete.

Common fields and operations involved in handling common fields will now be described in further detail with reference to FIGS. 8, 9, 10, and 11.

In order to facilitate the creation and use of common fields, the present embodiments provide utilities that can be used by webpage (or webpage application) developers. A utility in this sense is a software package or library that is installed/imported/otherwise referenced and exposes a public API that provides access to various functions.

Generally speaking, the utilities provide mechanisms for applications to retrieve current values of common fields, retrieve configuration data that can be used to create editing user interfaces for common fields (i.e. one or more user interface elements by which the value of a common field can be changed by a user), and update common field values.

In the present embodiments, three separate utilities are provided: a field configuration service which exposes methods for retrieving configuration data in respect of common fields (e.g. whether a field is required, whether it is editable, a field's allowed values, etc.); a field value service which exposes a method for fetching values of common field from a remote data store 336; and a field edit service which exposes methods to edit common field values. These three utilities will be described in turn.

In the present example, the field configuration service exposes a fetch field configuration function (referred to as a fetchFieldConfig function). The fetchFieldConfig function can be called by an application 314 to retrieve field configuration data in respect of a specific field from the server system 330. This function is called where an application wishes to make a field editable (via a UI element). As described below, if an application need only display a field value and does not need to make the field editable it may not need to retrieve configuration information via the fetchFieldConfig function.

Figure 8:
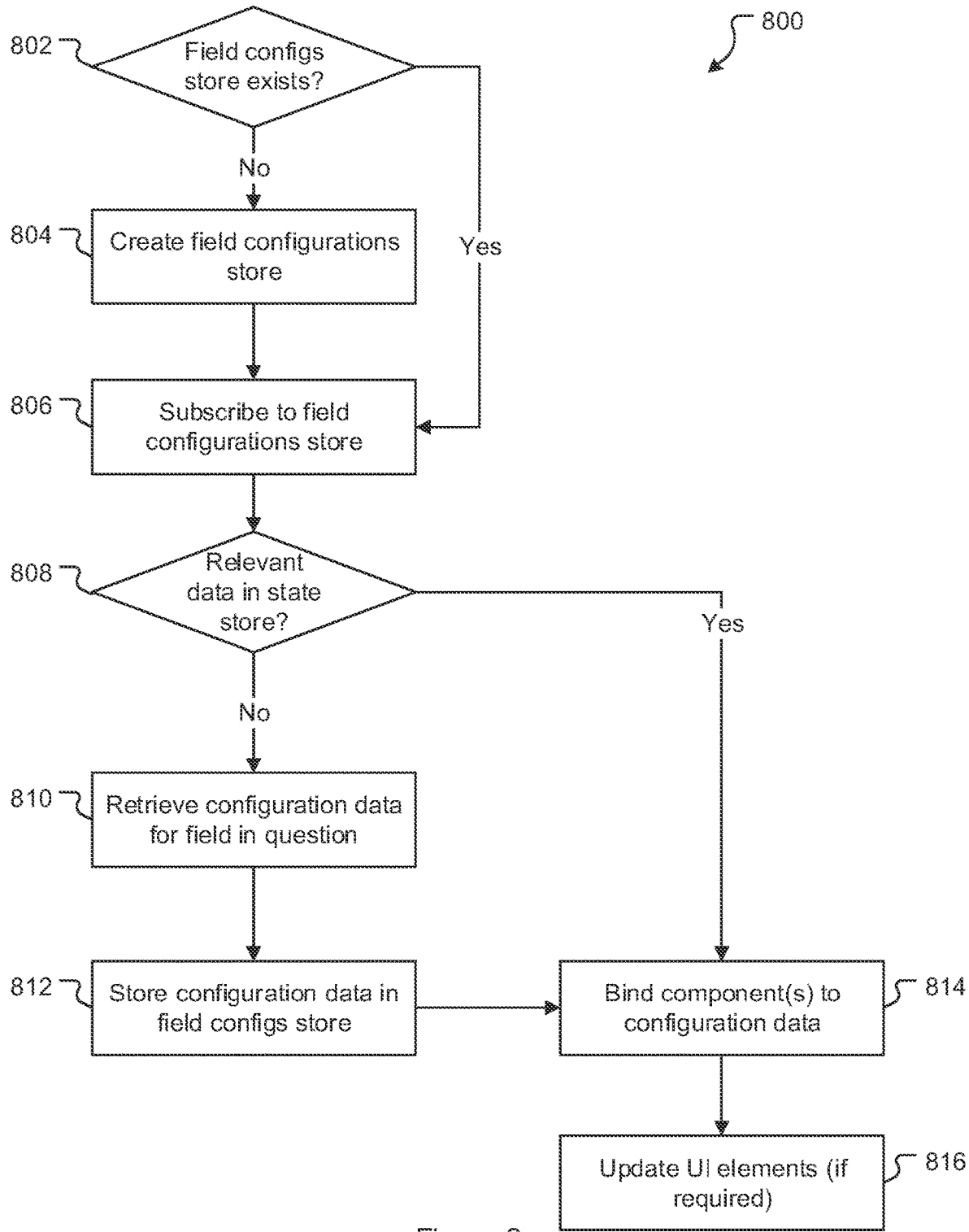
FIG. 8 is a flowchart depicting operations involved in initial processing of a common field configuration.

FIG. 8 provides a flowchart 800 depicting example operations that are performed when the fetchFieldConfig function is called. The fetchFieldConfig function is called with arguments/parameters that define a specific common field (identified, for example, by a field key and issue key). In this example the operations are performed by application 314A executed by browser 312.

At 802, application 314A determines if a field configurations store 320 has already been created for the webpage. A field configurations store 320 may already have been created by another webpage application of the webpage 100 (e.g. application 314B) or by the application being executed itself (e.g. application 314A).

If, at 802, the field configurations store 320 does not already exist, processing proceeds to 804. Otherwise, processing proceeds to 806.

At 804, application 314A creates a field configurations store 320 for the webpage. The field configurations store 320 is created in local memory of the user device 310, for example in volatile memory 408 thereof. As one example, the field configurations store 320 store may be a sweet-state store created by executing of a 'createStore( )' function (imported from the 'react-sweet-state' library) defined by the application's code. Alternative stores may be used for the field configurations store 320.

At 806, application 314A subscribes to the field configurations store 320. This may, for example, be via a hook to the field configuration store 320, e.g. by invoking the "createHook( )" function.

At 808, application 314A determines if configuration data in respect of the common field in question has already been stored in the field configurations store 320. This may have been done by application 314A itself, or by another application 314 of the webpage (e.g. application 314B).

If configuration data for the common field in question has not already been stored in the field configurations store 320, processing proceeds to 810. Otherwise processing proceeds to 814.

At 810, application 314A retrieves the configuration data for the common field in question. The data may be included in the webpage data already received. Alternatively, application 314A retrieves the data from the server system 330, for example using one or more API calls which identify the field and cause (for example) the server application 332 to retrieve the configuration data for that field from the remote data store 336 and return it.

The particular configuration data (and the format in which it is provided) will depend on context and implementation. By way of example, however, server system 330 may be configured to provide field configuration data such as the following:

| Field configuration data | Note |
|---|---|
| autoCompleteUrl: String I null | A URL that can be used by the application for autocomplete/look-ahead functionalities. For example, for a label field, if a user enters "pub", the application can pass that string to the autocompleteUrl to retrieve all labels starting with "pub". |
| allowedValues: FieldType [ ] | Data indicating the values allowed for the field. |
| isEditable: boolean | Data indicating whether the field is editable. |
| isRequired: boolean | Data indicating whether the field is required. |
| schema: FieldSchema | Metadata specific to the field in question. This metadata provides information such as the underlying native type of the field (e.g. a custom or system field) and any other relevant information. |
| title: string | For example, an i18n name for the field, which can either be generated by the system (for system fields) or created by the user (for custom fields). |

At 812, application 314A stores the configuration data retrieved at 810 in the field configurations store 320. This may be achieved by calling a further function exposed by the field configuration service—a setFieldConfiguration function—which is used to write field configuration data to the field configurations store 320. Where the field configurations store 320 is a sweet-state store, the setFieldValue function may execute a "setState( )" function to write a new value to the field configurations store 320.

At 814, application 314A binds/links any relevant components to the field configurations store 320.

Any components that are bound or linked to the field configurations store 320 receive the configuration data (as stored at 812 or as previously stored). As it is a common store, components from multiple webpage applications (e.g. 314A and 314B) may be bound to the field configurations store 320. A bound component can then perform various operations based on the configuration data. For example, the configuration data can be used to generate an editing interface (e.g. at 816) in respect of the common field in question—i.e. one or more user interface elements by which input for editing a current value of the common field can be input and received by application 314A (and/or application 314B).

In alternative examples, the application code may cause application 314A to retrieve data in respect of the common field from the remote data store (e.g. per 810) even if the field's configuration data already exists in the field configurations store 320. This serves as an enforced refresh of the common field's configuration data.

A given application 314A may define multiple common fields. In this case, operations 802, 804, and 806 need only be performed once by the application 314A.

The operations of process 800 have been described as being performed by the application 314A. In the present example, these operations are performed by calling the fetchFieldConfig function. As a result, an application developer need only call this function to obtain field configuration information (and have that information stored in a field configurations store 320) and does not need to explicitly program/concern themselves with the creation or maintenance of the field configurations store 320.

As noted at 812, in the present example the field configuration service also exposes a setFieldConfiguration function. This function can be called by an application 314 to write field configuration data for a particular field (identified, for example, by a fieldKey/issueKey combination) to the field configurations store 320.

In the present example, the field value service exposes a fetchFieldValue function. This function can be called by an application 314 to retrieve/fetch the current value of a particular field (identified for example by a fieldKey/issueKey combination) from the remote data store 336.

Figure 9:
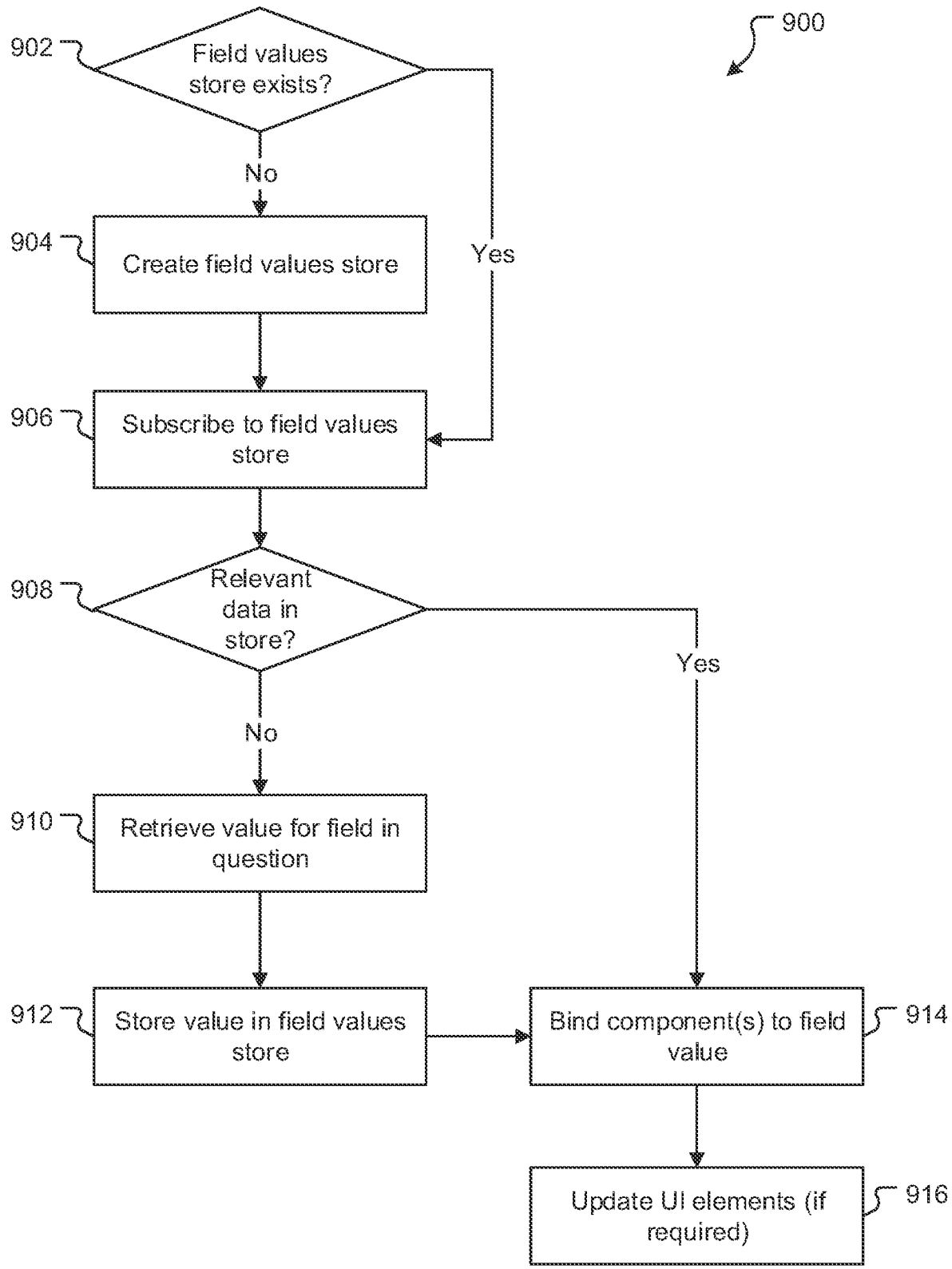
FIG. 9 is a flowchart depicting operations involved in initial processing of a common field value.

FIG. 9 provides a flowchart 900 depicting example operations that are performed when the fetchFieldValue function is called.

The operations performed when the fetchFieldValue function is called are very similar to those performed when the fetchFieldConfig function is called (and which are described above with reference to FIG. 8) excepting the operations are in respect of field values (rather than field configuration data) and a field values store 318 (rather than a field configurations store 320). Accordingly, these operations will not be described in detail again except to note that: at 902 the application 314A determines whether a field values store 318 already exists; at 904 application 314A creates a field values store 318 if it does not already exist; at 906 application 314A subscribes to the field values store (if not already done); at 908 application 314A determines whether the value of the common field in question is already stored in the field value store 318; at 910 application 314A retrieves the value of the common field in question (e.g. from remote data store 336 via an API call); at 912 application 314A stores the value of the common field in question in the field values store 318; at 914 application 314A binds/links relevant components to the field values store 318; and at 916 bound components of application 314A (or any other application, e.g. 314B) can perform operations based on the stored value of the common field (e.g. by updating one or more UI elements to display that value).

In the present example, the field value service also exposes a setFieldValue function which can be called by an application 314 to write a particular value for a particular field to the field values store 318. This function can be called, for example, by the fetchFieldValue function at 912 to store a value that has been retrieved in the field values store 318. Where the field values store 318 is a sweet-state store, the setFieldValue function may execute a "setState( )" function to write a new value to the field values store 318.

In the present example, the operations of process 900 are performed by calling the fetchFieldValue function. As a result, an application developer need only call this function to obtain the value of a supported common field (and have that value stored in a field values store 318). The developer does not need to explicitly program/concern themselves with the creation or maintenance of the field values store 318.

In the present example, the field edit service provides a saveValue function that can be called by an application 314 to save a new value for a specific common field. The new value may, for example, be the result of a locally originating change to a common field (for example a new value that has been input by a user via a UI element).

Figure 10:
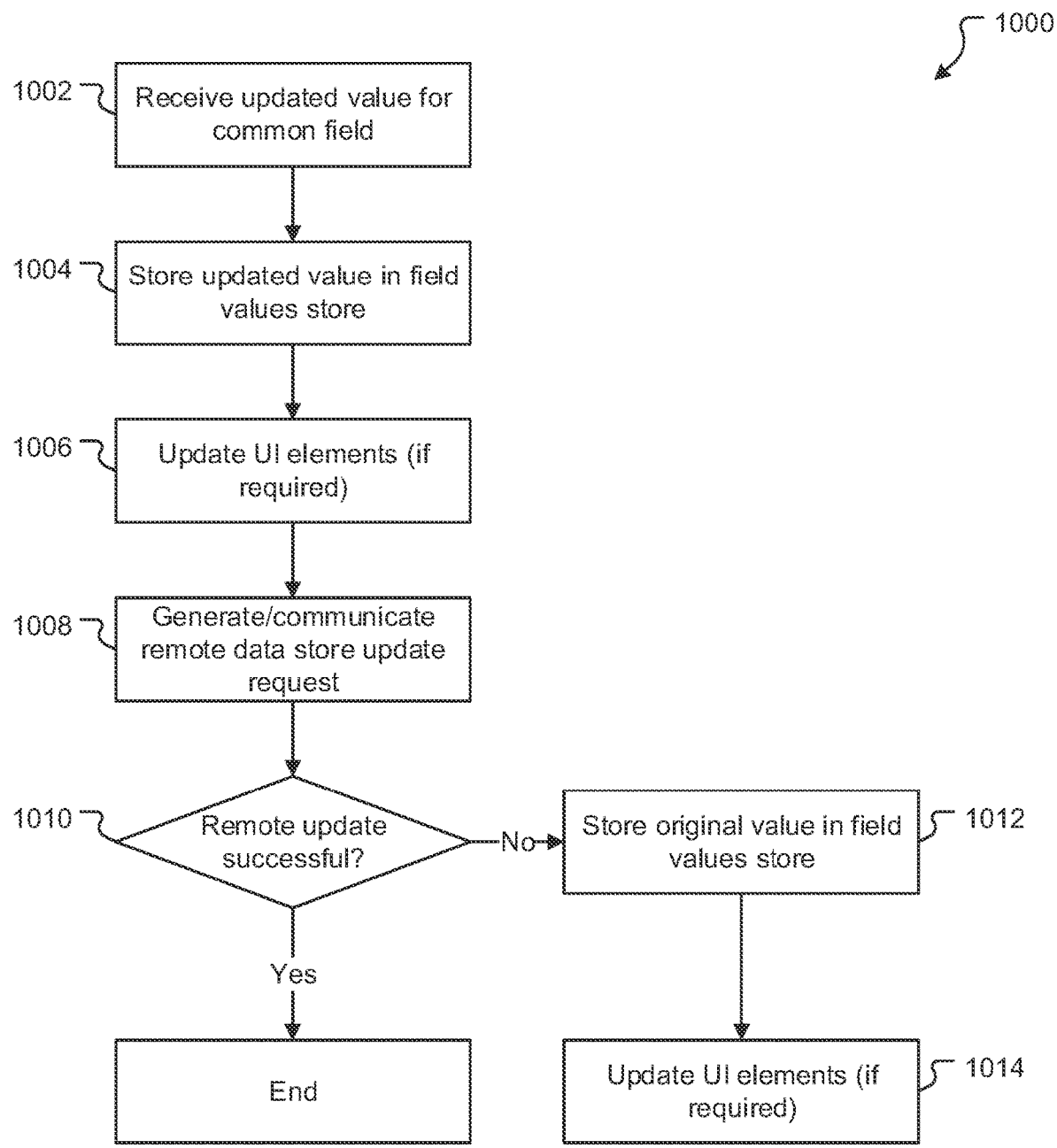
FIG. 10 is a flowchart depicting operations involved in processing a locally originating change of a common field.

FIG. 10 provides a flowchart 1000 depicting example operations that are performed when the saveValue function is called. In this example the locally originating change is made via a UI element controlled by a component of application 314A.

At 1002, application 314A receives an updated value for a common field. The field may be identified, for example, by a fieldKey/issueKey combination. In order to process the new value, application 314A invokes the saveValue function as provided by the field edit service which, in turn, causes the following processing to be performed.

At 1004, application 314A updates the field value in the field values store 318. This may, for example, be done using the setFieldValue function provided by the field value service (or an alternative function that writes the new value to the field values store 318).

Any components that are bound or otherwise linked to the field values store 318 receive the new field value (as stored at 1004). Once again it is noted that as the field values store 318 is a common store, components from multiple webpage applications (e.g. 314A and 314B) may be bound or linked thereto. On receiving the new field value, bound components can then perform various operations based on the new value including, for example, updating any relevant UI elements (at 1006) to display the value for the field that is now stored in the application-specific state store 316A.

For example, where issue assignee has been defined as a common field by application 314A and 314B, a user updating the assignee value using UI element 108 (controlled by a component of application 314A) will cause an update to the field in the field values store 318. The component of application 314B that handles the assignee UI element 110 (and is also bound/linked to the field values store 318) receives the change and, in response, can update the UI to display the new assignee value (without requiring any server communication or inter-application notification).

At 1008, application 314A generates and communicates a remote data store update request (e.g. by an API call). The request identifies the common field in question and includes the updated value for that field. The request is communicated (in this example) to web server application 332, which receives the request and attempts to update the field in the remote data store 336 (via data server application 334).

At 1010, application 314A determines if the remote data store update request was successful or not. For example, application 314A may receive an update response message from the web server application 332 indicating whether the updated value for the field was successfully stored in the remote data store 336 or not.

If the remote update was successful, processing the update is complete. If not, processing proceeds to 1012.

At 1012, application 314A reverts to the original (pre-update) value of the common field. This involves writing the original value of the field back to the field values store 318.

At 1014, any components that are bound or linked to the field values store 318 receive the reverted value of the field as stored at 1012. As with operation 1006 this can trigger various operations by the bound components, including updating UI elements to display the value for the field now stored in the field values store 318.

In alternative embodiments, rather than optimistically updating the field values store 318 at 1004, the saveValue function may operate so that the field values store 318 is only updated with the new value of a field once confirmation of a successful update has been received from the sever application 332. This prevents the possibility of the field's value needing to be rolled-back (e.g. at 1012 and 1014), but introduces a delay between a user updating the data field and seeing that change reflected in the UI.

As can be seen, by allowing a field (such as assignee) to be defined as common field, any change to a value of that field is displayed by all UI elements linked to the field (from any application) without having await a server update and/or inter-application notification. The result is that a user will not see different values for what should be the same field. For example, if a user updates UI element 108 (controlled by a component of application 314A) to record 'Amy Adams' as the assignee, UI element 110 (controlled by a component of application 314B) will immediately (or with minimal delay) also display 'Amy Adams', rather than being stuck displaying 'Fred Jones' until application 314B is notified/detects that a change has occurred and requests the new assignee value from the server system 330.

Furthermore, by providing a saveValue function such as that described above, a developer of an application 314 does not need to handle the processing required to update a field's value (e.g. by updating the field values store 318, updating the server system 330, and rolling back the value if the server update fails).

Figure 11:
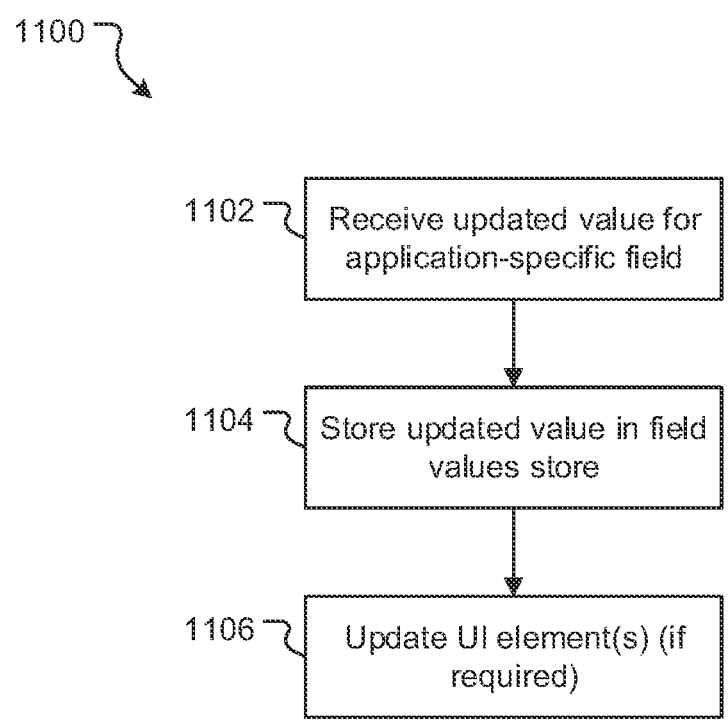
FIG. 11 is a flowchart depicting operations involved in processing a remotely originating change of a common field.

Referring to FIG. 11, a flowchart 1100 depicting operations involved in processing a remotely originating update to the value of a common field will be described. In this example the operations are described as being performed by application 314A (as executed by browser 312).

The operations performed for processing a remotely originating update to a common field are similar to those performed to process a remotely originating update to an application-specific field (described above with reference to FIG. 7). The exception is that a common state store (e.g. the field values store 318) is updated rather than an application-specific state store 314 and, consequently, all components of all applications that are bound to the common state store receive the updated data.

At 1102, an updated value for a particular common field is received.

As with operation 702 described above, an application (e.g. 314A) may request the new value may from the server system 330 (e.g. due to receiving a notification or otherwise detecting that the value of a common field has/may have changed) or the new value may be pushed from the server system 330 to the web browser 312/application 314A.

At 1104, application 314A updates the relevant field in the field values store 318 based on the updated value received from the server system 330.

Any components of applications (e.g. 314A and 314B) that are bound or linked to the field values store 318 receive the new field value (as stored at 1104). Bound components can then perform various operations based on the new value including, for example, updating any relevant UI elements (at 1106) to display the value for the field that is now stored in the field values store 318.

The update is then complete.

Figure 12:
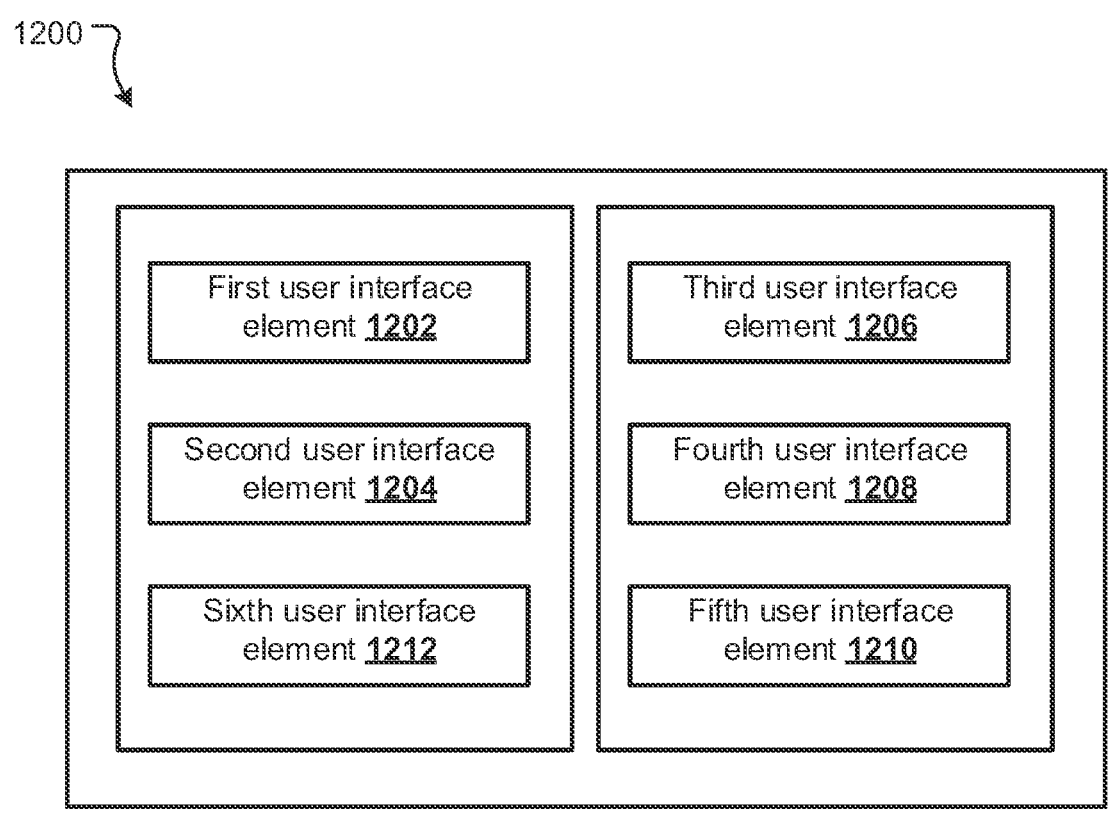
FIG. 12 depicts an example webpage.

To further illustrate the features described above, FIG. 12 provides an example webpage 1200.

A first application 314A of webpage 1200 creates a first application-specific state store 316A at the user device 310, for example as per operation 502 of FIG. 5. The first application 314A stores an initial value of a first application-specific field in the first application-specific state store 316A, for example as per operation 508 of FIG. 5. The first application 314A generates a first user interface element 1202 to display the initial value of the first application-specific field.

The first application 314A also creates a field values store 318 at the user device, for example as per operation 904 of FIG. 9. The first application 314A stores an initial value of a first common field in the field values store 318 (for example as per operation 912 of FIG. 9) and generates a second user interface element 1204 to display that value.

A second application 314B of the webpage 1200 receives the initial value of the first common field from the field values store 318, for example as per operation 916 of FIG. 9. The second application 314B generates a third user interface element 1206 to display the initial value of the first common field as received from the field values store 318.

In this example, the second application 314B creates a second application-specific state store 316B at the user device 310, for example as per operation 502 of FIG. 5. The second application 314B stores an initial value of a second application-specific field in the second application-specific state store 316B (for example as per operation 508 of FIG. 5.) and generates a fourth user interface element 1208 to display the initial value of the second application-specific field.

The second application 314B also stores an initial value of a second common field in the field values store 318 (for example as per operation 912 of FIG. 9) and generates a fifth user interface element 1210 to display the initial value of the second common field as stored in the field values store 318.

The first application 314A receives the initial value of the second common field from the field values store 318 (for example as per operation 916 of FIG. 9) and generates a sixth user interface element 1212 to display that value.

The first application 314A may then receive a first updated value for the first common field (for example as per operation 1002 of FIG. 10) and store the first updated value for the common field in the field values store 318 (for example as per operation 1004 of FIG. 10). The second application 314B receives the first updated value for the common field from the field values store 318 (for example as per operation 1006 of FIG. 10) and displays the first updated value for the common field using the third user interface element 1206.

As used herein the terms "include" and "comprise" (and variations of those terms, such as "including", "includes", "comprising", "comprises", "comprised" and the like) are intended to be inclusive and are not intended to exclude further features, components, integers or steps.

Unless required by context, the terms "first", "second", etc. are used to differentiate between various elements and features and not in an ordinal sense. For example, a first common field could be termed a second common field and vice versa without departing from the scope of the various described examples.

Various features of the disclosure have been described using flowcharts. The functionality/processing of a given flowchart operation could potentially be performed in various different ways and by various different systems or applications. Furthermore, it may be possible for a given flowchart operation to be divided into multiple operations and/or multiple flowchart operations to be combined into a single operation. Furthermore, in some instances the order of the steps may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method for generating a webpage on a user device, the method comprising:
   by a first application of the webpage:
      creating a first application-specific state store at the user device, the first application-specific state store used by the first application;
      storing an initial value of a first application-specific field in the first application-specific state store, the initial value of the first application-specific field received from a remote data store;
      generating a first user interface element to display the initial value of the first application-specific field;
      creating a field values store at the user device, the field values store being used by the first application and a second application of the webpage;
      storing an initial value of a first common field in the field values store, the initial value of the first common field received from the remote data store;
      generating a second user interface element to display the initial value of the first common field as stored in the field values store; and
   by the second application of the webpage:
      receiving the initial value of the first common field from the field values store; and
      generating a third user interface element to display the initial value of the first common field as received from the field values store.

2. The computer implemented method of claim 1, further comprising, by the first application:
   creating a field configurations store at the user device, the field configurations store being used by the first application and the second application of the webpage;
   storing first configuration data in the field configurations store, the first configuration data received from the remote data store and being configuration data in respect of the first common field; and
   using the first configuration data to generate an editing interface in respect of the first common field, the editing interface including one or more user interface elements by which input for editing a current value of the first common field can be received.

3. The computer implemented method of claim 1, wherein prior to creating the field values store the method further comprises, by the first application:
   determining whether the field values store already exists; and
   in response to determining that the field values store already exists, foregoing creating the field values store.

4. The computer implemented method of claim 1, wherein prior to storing the initial value of the first common field in the field values store the method further comprises, by the first application:
   determining whether an existing value of the first common field is already stored in the field values store; and
   in response to determining that the existing value of the first common field is already stored in the field values store, foregoing storing the initial value of the first common field in the field values store.

5. The computer implemented method of claim 4, wherein in response to determining that the existing value of the first common field is not already stored in the field values store, the method further comprises, by the first application:

retrieving the initial value of the first common field from the remote data store; and storing the initial value retrieved from the remote data store in the field values store.

6. The computer implemented method of claim 1, further comprising:
by the first application:
receiving a first updated value for the first common field; and
in response to receiving the first updated value for the first common field, storing the first updated value for the first common field in the field values store; and
by the second application:
receiving the first updated value for the first common field from the field values store; and
displaying the first updated value for the first common field using the third user interface element.

7. The computer implemented method of claim 6, wherein in response to receiving the first updated value for the first common field the method further comprises, by the first application:
generating an update request to have the first updated value stored by the remote data store; and
communicating the update request to a remote server.

8. The computer implemented method of claim 7, further comprising, by the first application:
receiving a response from the remote server indicating that the update request has failed; and
in response to receiving the response from the remote server, storing the initial value of the first common field in the field values store.

9. The computer implemented method of claim 6, further comprising:
by the second application:
receiving a second updated value for the first common field; and
in response to receiving the second updated value for the first common field, storing the second updated value for the first common field in the field values store; and by the first application:
receiving the second updated value for the first common field from the field values store; and
displaying the second updated value for the first common field using the second user interface element.

10. The computer implemented method of claim 1, further comprising:
by the second application:
creating a second application-specific state store at the user device, the second application-specific state store used by the second application;
storing an initial value of a second application-specific field in the second application-specific state store, the initial value of the second application-specific field received from the remote data store; and
generating a fourth user interface element to display the initial value of the second application-specific field.

11. The computer implemented method of claim 1, further comprising:
by the second application:
storing an initial value of a second common field in the field values store, the initial value of the second common field received from the remote data store; and
generating a fifth user interface element to display the initial value of the second common field as stored in the field values store; and by the first application:
receiving the initial value of the second common field from the field values store; and
generating a sixth user interface element to display the initial value of the second common field as received from the field values store.

12. A computer processing system comprising:
a processing unit;
a communications interface;
a display; and
a non-transitory computer-readable storage medium storing instructions, which when executed by the processing unit, cause the processing unit to generate a webpage by:
in accordance with instructions of a first application of the webpage:
create a first application-specific state store at the computer processing system, the first application-specific state store used by the first application;
store an initial value of a first application-specific field in the first application-specific state store, the initial value of the first application-specific field received from a remote data store via the communications interface;
generate, on the display, a first user interface element to display the initial value of the first application-specific field;
create a field values store at the computer processing system, the field values store being used by the first application and a second application of the webpage;
store an initial value of a first common field in the field values store, the initial value of the first common field received from the remote data store;
generate, on the display, a second user interface element to display the initial value of the first common field as stored in the field values store; and
in accordance with instructions of a second application of the webpage:
receive the initial value of the first common field from the field values store; and
generate, on the display, a third user interface element to display the initial value of the first common field as received from the field values store.

13. The computer processing system of claim 12, wherein execution of the instructions further cause the processing unit to, in accordance with instructions of the first application of the webpage:
create a field configurations store at the computer processing system, the field configurations store being used by the first application and the second application of the webpage;
store first configuration data in the field configurations store, the first configuration data received from the remote data store and being configuration data in respect of the first common field; and
use the first configuration data to generate, on the display, an editing interface in respect of the first common field, the editing interface including one or more user interface elements by which input for editing a current value of the first common field can be received.

14. The computer processing system of claim 12, wherein prior to creating the field values store, execution of the instructions further cause the processing unit to, in accordance with instructions of the first application of the webpage:
determine whether the field values store already exists; and in response to determining that the field values store already exists, forego creating the field values store.

15. The computer processing system of claim 12, wherein prior to storing the initial value of the first common field in the field values store, execution of the instructions further cause the processing unit to, in accordance with instructions of the first application of the webpage:
   determine whether an existing value of the first common field is already stored in the field values store; and
   in response to determining that the existing value of the first common field is already stored in the field values store, forego storing the initial value of the first common field in the field values store.

16. The computer processing system of claim 15, wherein in response to determining that the existing value of the first common field is not already stored in the field values store, execution of the instructions further cause the processing unit to, in accordance with instructions of the first application of the webpage:
   retrieve the initial value of the first common field from the remote data store; and
   store the initial value retrieved from the remote data store in the field values store.

17. The computer processing system of claim 12, wherein execution of the instructions further cause the processing unit to:
   in accordance with instructions of the first application of the webpage:
      receive a first updated value for the first common field; and
      in response to receiving the first updated value for the first common field, store the first updated value for the first common field in the field values store; and
   in accordance with instructions of the second application of the webpage:
      receive the first updated value for the first common field from the field values store; and
      display the first updated value for the first common field using the third user interface element.

18. The computer processing system of claim 17, wherein in response to receiving the first updated value for the first common field, execution of the instructions further cause the processing unit to, in accordance with instructions of the first application of the webpage:
   generate an update request to have the first updated value stored by the remote data store; and
   communicate the update request to a remote server.

19. The computer processing system of claim 18, wherein execution of the instructions further cause the processing unit to, in accordance with instructions of the first application of the webpage:
   receive a response from the remote server indicating that the update request has failed; and
   in response to receiving the response from the remote server, store the initial value of the first common field in the field values store.

20. The computer processing system of claim 17, wherein execution of the instructions further cause the processing unit to:
   in accordance with instructions of the second application of the webpage:
      receive a second updated value for the first common field; and
      in response to receiving the second updated value for the first common field, store the second updated value for the first common field in the field values store; and
   in accordance with instructions of the second application of the webpage:
      receive the second updated value for the first common field from the field values store; and
      display the second updated value for the first common field using the second user interface element.

* * * * *